United States Patent [19]

Hartry

[11] Patent Number: 4,469,001

[45] Date of Patent: * Sep. 4, 1984

[54] METHOD OF FORMING A NON-TUNABLE HEAD

[75] Inventor: Donald R. Hartry, La Canada, Calif.

[73] Assignee: Remo, Inc., North Hollywood, Calif.

[ * ] Notice: The portion of the term of this patent subsequent to Nov. 2, 1999 has been disclaimed.

[21] Appl. No.: 411,292

[22] Filed: Aug. 25, 1982

Related U.S. Application Data

[62] Division of Ser. No. 250,910, Apr. 3, 1980, abandoned.

[51] Int. Cl.[3] ........................ G10D 13/02; B29C 25/00

[52] U.S. Cl. .................................. 84/269; 84/411 R; 84/414; 84/418; 264/342 R

[58] Field of Search ................. 84/411 A, 411 R, 414, 84/418, 420, 269; 264/229, 230, 292, 342, DIG. 71

[56] References Cited

U.S. PATENT DOCUMENTS

| | | |
|---|---|---|
| RE. 26,415 | 6/1968 | Ludwig . |
| 233,604 | 7/1880 | Deutsch . |
| 627,766 | 6/1899 | Wilken . |
| 729,936 | 6/1903 | Haybeck . |
| 1,018,767 | 2/1912 | Logan . |
| 1,809,050 | 6/1931 | Logan . |
| 2,018,182 | 10/1935 | Logan . |
| 2,034,716 | 3/1936 | Dreyfus . |
| 2,110,029 | 3/1938 | Shastock . |
| 2,655,071 | 10/1953 | Levay . |
| 2,667,098 | 1/1954 | McMullen . |
| 2,830,484 | 4/1958 | Erwin . |
| 2,934,989 | 5/1960 | Belli . |
| 2,979,981 | 4/1961 | Ludwig . |
| 2,981,978 | 5/1961 | Griffing . |
| 3,250,169 | 5/1966 | Stone . |
| 3,272,057 | 9/1966 | Saito . |
| 3,285,117 | 11/1966 | Cheslow . |
| 3,362,275 | 1/1968 | Koishikawa . |
| 3,405,586 | 10/1968 | Koishikawa . |
| 3,418,877 | 12/1968 | Ito . |
| 3,425,309 | 2/1969 | Elzas . |
| 3,459,093 | 8/1969 | Nishiura . |
| 3,492,904 | 2/1970 | Koishikawa . |
| 3,647,931 | 3/1972 | Koishikawa . |
| 3,668,296 | 6/1972 | Criscuolo . |

FOREIGN PATENT DOCUMENTS

| | | |
|---|---|---|
| 626408 | 2/1960 | Italy . |

*Primary Examiner*—Thomas H. Tarcza
*Attorney, Agent, or Firm*—Lyon & Lyon

[57] ABSTRACT

A method of forming a non-tunable head for a drum, banjo, tambourine, or similar musical instrument is described. A highly oriented crystalline polymeric film is immersed into a liquid solvent bath containing a halogenated methane compound until the film swells to become sufficiently soft so that it can be draped. The film is then removed from the solvent bath and preferably mechanically wiped to remove solvent remaining on its surface. The film is securely attached to an annular member before it dries, and is then dried by allowing the solvent to evaporate. As the film dries, it shrinks to substantially its original dimensions to provide a constant tension in the head. The heads formed by this method have sufficient tension to provide an effective musical tone without the utilization of clamping or stretching means which must be periodically readjusted to maintain a desired tension in the head.

16 Claims, 7 Drawing Figures

METHOD OF FORMING A NON-TUNABLE HEAD

CROSS-REFERENCE TO RELATED APPLICATION

This is a division, of application Ser. No. 250,910, filed Apr. 3, 1980 now abandoned. This application is related to the application entitled Pretuned Head for Drum or the Like, Ser. No. 250,912, now U.S. Pat. No. 4,416,181, for which applicant is coinventor with Remo D. Belli, the disclosure of which is incorporated herein by reference.

BACKGROUND OF THE INVENTION

1. Field of the Invention

The present invention is directed to a method of forming a non-tunable head for a drum, tambourine, banjo, or similar musical instrument. More specifically, the head formed by the method of the present invention is sufficiently tensioned to provide an effective musical tone without the utilization of clamping or stretching means which must be periodically readjusted to maintain a desired tension in the head.

2. Description of the Prior Art

Various types of heads for drums, tambourines, and similar musical instruments have long been known in the art. Such heads range from the relatively unsophisticated, namely, the stretching of a piece of paper or fabric over an opening, to the very expensive heads used by professional drummers, which utilize animal skins as well as advanced synthetic materials and elaborate clamping means to provide variable tones of the desired quality.

However, the unsophisticated paper-type heads are, in reality, no more than just toys as they are not capable of producing an effective tone of sufficient musical quality. Conversely, the heads utilized by professional drummers are not only very expensive, but also require a frequent and often cumbersome adjustment of the clamping means to keep the head properly tensioned to provide the desired tonal quality, or, in the case of animal skins, require means for heating and drying the skin to provide the desired tension. Many persons, however, desire a head for a drum or similar musical instrument which can provide an effective musical tone without constant adjustments and which does not require a large expenditure of money.

SUMMARY OF THE INVENTION

The present invention provides a method of forming a non-tunable head for a drum, tambourine, banjo, or similar musical instrument. Accordingly, in an exemplary embodiment, a highly oriented crystalline polymeric film is immersed into a liquid solvent bath containing a halogenated methane compound until the film swells to become sufficiently soft so that it can be draped. The polymeric film is then removed from the bath and preferably mechanically wiped to remove solvent remaining on its surface. The film is securely attached to a member having an opening therein, such as an annular member, before it dries. The simplest form of attachment is by stretching the film across the annular member and adhesively bonding the film to the member. The film is then dried by allowing the solvent to evaporate. As the film dries, it shrinks to substantially its original dimensions. Since the film is securely attached to the annular member, as it shrinks it becomes sufficiently tensioned to provide an effective musical tone.

Suitable polymeric films include polyester materials, such as the biaxially oriented film of the condensation polymer of ethylene glycol and terephthalic acid commonly known as MYLAR ®. Also, the polymeric film may be laminated to itself or to a different material, such as a polyethlene, which does not swell in the solvent bath. A preferred solvent is methylene chloride because of its fast action and quick drying.

The non-tunable heads formed in this manner are sufficiently tensioned after the solvent has evaporated to provide a suitable musical tone when struck by hand or by an object such as a drum stick without employing a clamping or similar means to tension the head. Moreover, the heads formed by the method of the present invention are simple and economical to manufacture.

Accordingly, it is an object of this invention to provide an improved non-tunable head for a drum, tambourine, banjo or similar musical instrument.

It is a further object of this invention to provide a non-tunable head which is sufficiently tensioned to provide a suitable musical tone when struck by an object.

It is a further object of this invention to provide a non-tunable head which is simple and economical to manufacture.

The manner in which these and other objects and advantages of the invention are achieved will become apparent from the detailed description of the preferred embodiment which follows.

BRIEF DESCRIPTIONS OF DRAWINGS

DETAILED DESCRIPTION OF THE INVENTION

Figure 1:
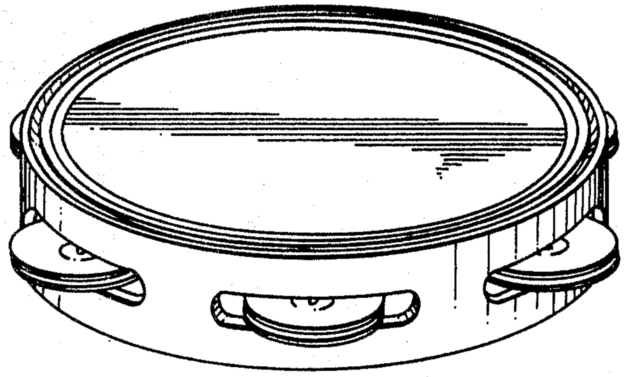
FIG. 1 is a perspective view showing a non-tunable head of the present invention mounted on a tambourine.

In general, the steps of the process of the present invention are as follows. A highly oriented crystalline polymeric film is immersed into a liquid solvent bath until the film swells to become sufficiently soft so that it can be draped. The film is then removed from the solvent bath and preferably mechanically wiped to remove solvent remaining on the surface of the film. Before the film dries, it is securely attached to a member having an opening therein, such as an annular member. The film is then dried by allowing the solvent to evaporate. As the film dries, it shrinks to substantially its original dimensions. Since the film is securely attached to the member, as it shrinks it becomes sufficiently tensioned to provide an effective musical tone when struck by an object.

The highly oriented crystalline polymeric film may be any polyester which has a sufficient modulus of elasticity to carry most of the tension load since it is the primary tension load carrier for the head. In order to avoid attendant vibration problems inherent in heads of increasing weight, the layer of polymeric film is preferably relatively thin, ranging from about 0.003 to about 0.014 inch in thickness. The thickness of the polymeric film is generally less in a drum head than in heads for other musical instruments, such as bongos. Moreover, while a cleaner tone is produced by a thinner polymeric film, the primary tension load carrier in a head must also provide sufficient strength for the head when it is struck by an object such as a drum stick or a hand. Consequently, layers of polymeric film which are substantially less than 0.003 inch in thickness generally do not appear to provide sufficient strength for the head.

A particularly preferred highly oriented crystalline polymeric film is the biaxially oriented film of the condensation polymer of ethylene glycol and terephthalic acid. Such a polymeric film is produced by E.I. DuPont de Nemours & Co., Inc. under the trademark MYLAR. MYLAR is not susceptible to moisture and changes in the weather, and has good flexibility, durability, and tensile strength. However, other highly oriented crystalline polyester films may also be successfully used in the practice of the present invention.

In addition, the polymeric film may be laminated to itself, or to a material which carries very little of the load when such a laminated head is tensioned, but rather provides a "cushioning effect" when struck by a drum stick or similar object by distributing load without transferring stress into the polymeric film. Consequently, it is not necessary that such a material swell in the solvent bath, nor does its lack of swelling appear to affect the degree of tension subsequently obtained due to the swelling of the polymeric film. Particularly preferred materials are polyethylene fabric materials having random fiber orientation, such as spunbonded olefins. Since these laminated materials are not relied upon to carry the tension load or to add strength or reinforce the head formed by the method of the present invention, this material may be relatively thin in order to reduce the weight of the head. Generally, the polyethylene fabric materials having random fiber orientation weigh from about 1.0 to 2.3 ounces per square yard and preferably from 1.3 to about 1.6 ounces per square yard. In addition to acting as a "cushion" to distribute the force of impact from a stick or similar object that strikes the playing surface, the laminated material reduces the tendency of the polymeric film to deform and form dents in the playing area, as well as damping undesirable overtones.

A particularly preferred spunbonded olefin fabric material which may be laminated to the polymeric film used in the heads formed by the method of the present invention is produced by E.I. DuPoint de Nemours & Co., Inc. under the trademark TYVEK®. TYVEK affords a playing surface very similar to natural skins, and presents a playing surface having improved brush response but without the moisture and temperature sensitivity of heads manufactured from natural skins. TYVEK® also has good dimensional stability, high resistance to water-borne soiling agents, high tear strength, and high resistance to age degradation, although it may be treated to prevent degradation from ultraviolet rays from sunlight or from fluorescent lamps. It should be noted that TYVEK is particularly sensitive to many solvents and adhesives, and care must be taken in selecting the adhesive resin composition used in the lamination process, including the impregnating resin composition, and in the liquid solvent bath used in the present invention so as not to retard TYVEK®'s beneficial properties. Other synthethic fabric materials having a random fiber orientation may also be successfully used in the practice of the present invention, including NOMEX® from E.I. Dupont de Nemours & Co., Inc. and certain fiberglass materials having random fiber orientation. However, as fiberglass has a relatively high specific gravity, laminated heads employing such a fabric tend to weigh more, thereby increasing the potential of undesirable vibrations and reducing resonance and projection.

An elastomeric high density polyolefin adhesive is preferably applied to the polymeric film in thicknesses ranging from 0.00 to 0.006 inch to laminate it to the polyethylene fabric materials having random fiber orientation. A preferred high density polyolefin adhesive can be commercially purchased already applied to MYLAR® in these thicknesses under the name of NAPLAM from General Binding Corp. in Northbrook, Ill.

Laminated heads suitable for use in the method of the present invention are more particularly described and set forth in applicant's pending application Ser. No. 081,844, now U.S. Pat. No. 4,308,782 entitled "Laminated Head of Plastic Sheet Material and A Synthetic Fabric Material Having Random Fiber Orientation", which was filed in the United States Patent and Trademark Office on Oct. 4, 1979, the disclosure of which is hereby incorporated by reference.

The liquid solvent bath may be any such bath commonly employed in the art which will completely cover the polymeric film as it is immersed therein. Solvents containing halogenated methane compounds are used as the liquid solvent to cause the polymeric film to swell. Particularly preferred solvents include methylene chloride and chloroform due to their fast action and quick drying. The solvent bath preferably remains at ambient temperature.

The polymeric film must be immersed in the liquid solvent bath until the film swells to become sufficiently soft so that it can be draped. In general, various types of polyester films have been found to swell up to approximately 5% areawise upon immersion in the liquid solvent bath. The period of time that the film must remain in the solvent bath to obtain the desired swelling will vary depending upon the type and thickness or weight of the film. For example, a sheet of MYLAR® having a thickness of about 0.005 inch may be sufficiently swollen so that it can be draped after immersion in the solvent bath for approximately two hours, while a laminated material as described in applicant's pending application Ser. No. 081,844, containing a sheet of TYVEK laminated to a sheet of MYLAR ®, may require between twenty to thirty hours until the MYLAR® film swells to become sufficiently soft so that it can be draped.

When the film is removed from the solvent bath, it is preferably mechanically wiped in order to remove solvent remaining on the surface of the film. This mechanical wiping may take the form of a towel lightly rubbed across the surface of the film, or a stream of air may be directed at the surface of the film to blow off the solvent. If the film is to be adhesively bonded to the annular member, the solvent on the surface of the film must be removed to avoid interference with the adhesive bond.

Figure 1A:
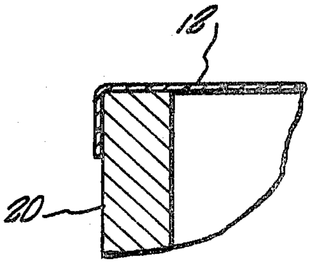
FIG. 1A shows the attachment of a polymeric film to the shell of a musical instrument by merely stretching the film across the opening in the shell and adhesively bonding it thereto.

The film must be securely attached to a member having an opening therein, such as an annular member, e.g., an aluminum drum hoop, before it dries in order to obtain the necessary tension to provide an effective musical tone. Generally, the film may be attached to the member in a variety of ways, depending upon the musical instrument and its intended use. For example, as shown in FIG. 1A, the simplest method of attachment is merely stretching the polymeric film 12 across an annular member, such as a drum shell 20, and adhesively bonding the film to the outer periphery of the annular member by applying an adhesive thereto in a conventional manner and using a large hose clamp. The film may also be secured to the shell by staples, tacks, or the like.

Figure 2:
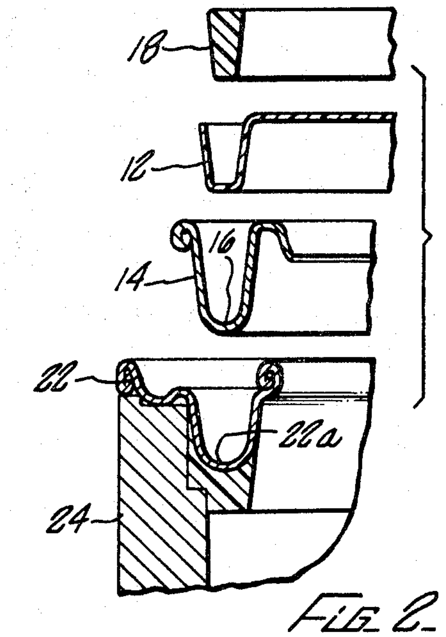
FIG. 2 is an exploded view showing the preferred head construction apparatus used to mount the non-tunable heads formed by the process of the present invention in the shell of a musical instrument. Alternate embodiments shown in FIGS. 2A and 2B illustrate different ways of securing the ring 22 to the instrument shell.
Figure 2A:
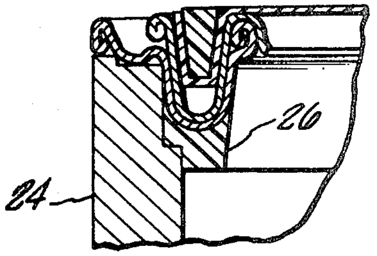
Figure 2B:
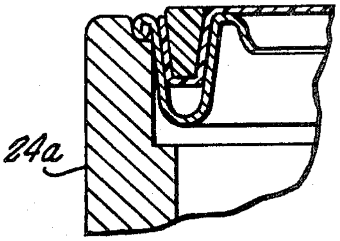

However, a preferred method of attaching the film to an annular member so that the head can be readily installed and removed from a musical instrument is shown in FIG. 2. The polymeric film 12 is stretched across an annular hoop 14 having a channel 16 formed therein. The channel may be of any suitable shape, but preferably has a generally U- or V-shaped cross-section as shown in FIGS. 2, 2A, and 2B, or a generally J-shaped cross-section. The channel is preferably at least partially filled with an adhesive, and an annular plug 18 is inserted into the channel formed in the annular hoop such that the polymeric film is stretched as it is forced into the channel to contact the adhesive. The plug stretches and shapes the polymeric film as it is forced into the channel, and is preferably adhesively bonded to the annular hoop to prevent any rattle when the head is struck by an object. Thus, the plug, while essential in shaping and stretching the polymeric film to obtain a pre-tensioning of the film, is not believed to be essential in retaining the film in the channel since the film is securely adhesively bonded therein. Preferably, a fast-acting adhesive, such as a cyanoacrylate is used since it will set in a matter of minutes. Suitable cyanoacrylate adhesives include "CA-5" from the 3M Company,and "240" from Permabond, a division of National Starch.

The annular hoop 14 corresponds in shape to an annular cavity *22a* in an annular ring 22 which is secured or integrally formed along the edge of the shell 24 of the musical instrument. Since the channel 16 in the annular hoop firmly engages the similarly shaped cavity *22a* in the annular ring as shown in FIG. 2A, the head can be easily installed and removed from the musical instrument. The interior of the instrument shell 24 and *24a* can be shaped in various ways to retain the annular ring 22 secured thereto, such as by a friction fit, or by the use of adhesives. Two possible embodiments are shown in FIGS. 2A and 2B. As shown in FIG. 2A, a suitable adhesive composition 26, such as an epoxy or a polyurethane, may be employed to secure the annular ring 22 to the shell 24. This mounting apparatus is similar to the top of a paint can which easily snaps into or is removed from the rim on the can itself. Such a mounting construction is particularly suitable with tambourines as shown in FIG. 1 as it permits the instrument to be played either with or without the head, as the occasion may require, and the change can be easily and quickly accomplished by merely snapping the head into or out of the shell. In addition, this mounting construction also permits the quick and easy replacement of a worn or torn head.

Figure 3:
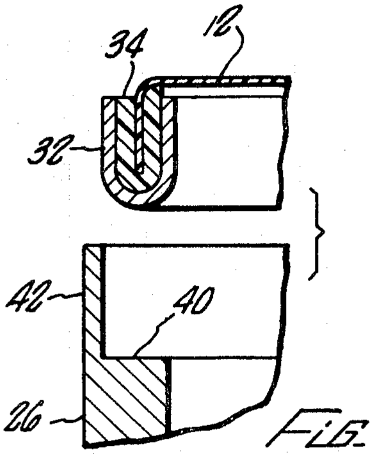
FIG. 3 is an exploded view showing a second preferred head construction apparatus wherein the head can be mounted inside or over the rim on the instrument shell as shown in FIGS. 3 and 3A.
Figure 3A:
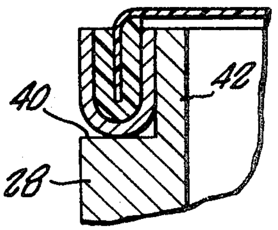

Another method of attaching the film to an annular member to form a non-tunable head by the method of the present invention is shown in FIG. 3. The film 12 is stretched across an annular hoop 32 with the edge being inserted into a channel formed in the annular hoop which has been at least partially filled with a fast setting adhesive 34, such as a cyanoacrylate. This head may then be readily mounted in or removed from a musical instrument with a shell 26 or 28 having a shoulder 40 and an axially extending rim therefrom 42 as shown in FIGS. 3 and 3A. The head may be mounted either inside the rim 42 as shown in FIG. 3 or over the rim as in FIG. 3A.

After the film has been securely attached to the annular member, it is then dried by allowing the solvent to evaporate. The evaporation may take as long as 24–48 hours, depending on the type and weight or thickness of the film. However, the solvent generally may be allowed to evaporate at room temperature as the addition of heat does not appear to substantially increase the rate of evaporation. As the solvent evaporates, the film shrinks to substantially its original dimensions. Since the film has been securely attached to the annular member, as it shrinks the film becomes sufficiently tensioned to provide an effective musical tone. The amount of tension provided by the shrinking will vary somewhat depending upon the period of time that the film was immersed in the solvent bath since the film appears to continue to swell, although by increasingly smaller amounts, the longer that it remains in the solvent. In addition, the final degree of tension ultimately achieved is also dependent upon the extent to which the film is stretched across the annular member as it is attached thereto before it dries. However, placing the polymeric film across the annular member and inserting an annular plug into the channel so that the film is stretched as it is forced in the channel as shown in FIG. 2 has been found to provide a suitable degree of stretching.

A preferred head for a drum, tambourine, banjo, or similar musical instrument can be formed using a MYLAR polyester film about 0.007 inch in thickness having a 0.001 inch thick layer of an elastomeric high density polyolefin adhesive on one side. The polyester film is laminated to a spunbonded olefin fabric material about 0.006 inch in thickness, such as TYVEK ®, as described in U.S. patent application Ser. No. 081,844. This laminated film is immersed into a liquid solvent bath containing methylene chloride for about twenty to thirty hours to obtain a swelling of approximately 5% areawise. The film is then removed from the solvent bath, and the methylene chloride is removed from the surface of the film by directing a stream of air at the surface of the film to blow off the solvent. An aluminum annular drum hoop having a channel formed along the edge thereof is at least partially filled with a cyanoacrylate adhesive, and the film is placed across the hoop within about four or five minutes after removal from the bath by shaping it along its bonding surface, using suitable tooling known in the art to apply a force of about 2 lbs. per peripheral inch in order to stretch the film to bring it within 0.040 inch of the hoop. A pressure of approximately 15 p.s.i. is applied by the tooling for several minutes to allow for the preliminary set of the cyanoacrylate adhesive. The film is then dried by allowing the methylene chloride to evaporate from the film, taking from 36 to 48 hours under ambient conditions. In particular, the application of temperatures above 90° F. do not appear to advantageously aid the drying process. As the solvent evaporates, the film shrinks to substantially its original dimensions which induces sufficient tension in the film to provide an effective musical tone when struck by an object. This head construction may then be shaped into an annular ring having a cavity formed therein which corresponds in shape to the channel formed in the annular hoop, the ring being secured to or integrally formed along the edge of the instrument shell. The apparatus and method of mounting a head as described herein is particularly advantageously used with tamboutines as shown in FIG. 1.

While the preferred application of this invention has been shown and described, it would be apparent to those skilled in the art that many more modifications are possible without departing from the inventive concept herein described. The invention, therefore, is to be limited only by the lawful scope of the claims which follow.

I claim:

1. A non-tunable head for a drum, tambourine, banjo, or similar musical instrument which is manufactured by a process comprising: swelling a highly oriented crystalline polymeric film by immersing said film into a liquid solvent bath until said film becomes sufficiently soft soft so that it can be draped, said solvent being a halogenated methane compound; removing said film from said bath; attaching said film to a member having an opening therein before said film dries; drying said attached film by evaporating said solvent, said film shrinking to substantially its original dimensions such that the film is tensioned.

2. The non-tunable head of claim 1 wherein said film is a polyester.

3. A non-tunable head as in claim 1 or 2 wherein said film is the biaxially oriented film of the condensation polymer of ethylene glycol and terephthalic acid.

4. A non-tunable head as in claim 1 or 2 wherein said film is laminated to a material which does not swell in the solvent bath.

5. A non-tunable head as in claim 4 wherein said material is a spunbonded olefin.

6. A non-tunable head as in claim 1 wherein said solvent is methylene chloride.

7. A non-tunable head as in claim 1 wherein the film is mechanically wiped after removal from said bath by directing a stream of pressurized air across said film to remove solvent remaining on the surface of the film.

8. A non-tunable head as in claim 1 wherein said film is attached to an annular member by stretching said film across said member and bonding said film to said member.

9. An non-tunable head as in claim 8 wherein a cyanoacrylate adhesive is used to bond the film to the annular member.

10. A non-tunable head as in claim 3 wherein said biaxially oriented film is immersed in the solvent bath for at least 2 hours.

11. A non-tunable head for a drum, tambourine, banjo or similar musical instrument manufactured by the process comprising: swelling a biaxially oriented film of the condensation polymer of ethylene glycol and terephthalic acid by inserting said film into a liquid solvent bath for at least two hours, said solvent being methylene chloride; removing said film from said bath; mechanically wiping said film to remove solvent remaining on the surface of the film; attaching said film to an annular member by stretching said film across said member and bonding said film to said member before said film dries; drying said attached film by evaporating said solvent, said film shrinking to substantially its original dimensions such that the film is tensioned.

12. A non-tunable head as in claim 11 wherein said film is laminated to a material which does not swell in the solvent bath.

13. A non-tunable head as in claim 12 wherein said material is a spunbonded olefin.

14. A non-tunable head as in claim 11 wherein a cyanoacrylate adhesive is used to bond the film to the annular member.

15. A head for a drum, tambourine, banjo or similar musical instrument which is pretensioned using the process comprising; swelling a highly oriented crystalline polymeric film by immersing said film into a liquid solvent bath until said film becomes sufficiently soft so that it can be draped, said solvent being a halogenated methane compound; removing said film from said bath; attaching said film to a member having an opening therein before said film dries; drying said attached film by evaporating said solvent, said film shrinking to substantially its original dimensions such that the film is tensioned.

16. A head for a drum, tambourine, banjo or similar musical instrument which is pretensioned using the process comprising: swelling a biaxially oriented film of the condensation polymer of ethylene glycol and terephthalic acid by inserting said film into liquid solvent bath for at least two hours, said solvent being methylene chloride; removing said film from said bath; mechanically wiping said film to remove solvent remaining on the surface of the film; attaching said film to an annular member by stretching said film across said member and bonding said film to said member before said film dries; drying said attached film by evaporating said solvent, said film shrinking to substantially its original dimensions such that the film is tensioned.

* * * * *